Nov. 29, 1949     T. W. KENYON     2,489,294
FLIGHT ATTITUDE INDICATING INSTRUMENT
Filed June 21, 1947     7 Sheets-Sheet 1

Fig. 1.

INVENTOR.
THEODORE W. KENYON
BY Kenyon & Kenyon
ATTORNEYS

INVENTOR.
THEODORE W. KENYON
BY
Kenyon & Kenyon
ATTORNEYS

INVENTOR.
THEODORE W. KENYON
BY
Kenyon & Kenyon
ATTORNEYS

Nov. 29, 1949 T. W. KENYON 2,489,294
FLIGHT ATTITUDE INDICATING INSTRUMENT
Filed June 21, 1947 7 Sheets-Sheet 5

Fig. 9.

INVENTOR.
THEODORE W. KENYON
BY
Kenyon + Kenyon
ATTORNEYS

Nov. 29, 1949  T. W. KENYON  2,489,294
FLIGHT ATTITUDE INDICATING INSTRUMENT
Filed June 21, 1947  7 Sheets-Sheet 6

INVENTOR.
THEODORE W. KENYON
BY
Kenyon & Kenyon
ATTORNEYS

Nov. 29, 1949 — T. W. KENYON — 2,489,294
FLIGHT ATTITUDE INDICATING INSTRUMENT
Filed June 21, 1947 — 7 Sheets-Sheet 7

INVENTOR.
THEODORE W. KENYON
BY
Kenyon & Kenyon
ATTORNEYS

Patented Nov. 29, 1949

2,489,294

UNITED STATES PATENT OFFICE 2,489,294

FLIGHT ATTITUDE INDICATING INSTRUMENT

Theodore W. Kenyon, Huntington, N. Y., assignor to Kenyon Gyro & Electronics Corporation, Huntington, N. Y., a corporation of New York Application June 21, 1947, Serial No. 756,181

5 Claims. (Cl. 33—204)

This invention relates to flight instruments designed especially to present attitude information to an aircraft pilot during flight and more particularly to a device of this character that will function both as a pitch and bank or roll indicator. While the instrument is primarily an instrument useful with aircraft, it can, of course, be used with other moving bodies such as submarines, or boats or projectiles that are subject both to pitch and roll or bank during their motions.

During flight a pilot requires information as to the attitude of his airplane at all times. Attitude information includes the extent of right or left roll of the aircraft about an axis substantially parallel with the fore and aft axis of the airplane and also the extent of upward or downward tilt (pitch) of the nose of the airplane during flight in departures from level flight.

In clear weather attitude information is partially available by visual reference to horizon, clouds and other fixed visible references. For bad weather and for more accurate attitude information, various types of attitude instruments have been provided for installation in aircraft. However, difficulties have arisen in the use of such earlier attitude instruments of which I am aware for many reasons. Among the difficulties have been likelihood of error in reading, and complexity and inaccuracy of such instruments.

Pilot fatigue induced by stress and variation in pilot training procedure with resulting errors in the handling of controls or in the reading of instruments giving control information in the aircraft during flight are frequently the principal causes of accidents that could have been avoided had the aircraft been equipped both with more readily identifiable controls and more readily identifiable control information giving instruments. In recent years the controls arranged in the cockpit of an airplane have become so numerous that accident hazards despite increased safety equipment have not been diminished as much as could be desired. Controls or instruments giving control information now in use may be of different form and in different places from correspondingly functioning devices in training planes or in aircraft previously flown by the pilot. When fatigued or confused, the pilot reverts frequently to original flight training habits and looks for the needed control or flight information giving instrument in locations they had in earlier aircraft that he has flown, for example, during training. The result often is an accident, unless the needed control or flight information giving instrument in the airplane actually being flown is so distinctive that the possibilities of erroneous identification, regardless of original pilot training habits, are materially reduced.

An object of the present invention is the provision of error reducing flight attitude information giving instruments designed to enable the pilot to determine the extent both of the roll or bank of the aircraft and of its pitch during flight by quick observation of visible parts of a single such instrument, all arranged to lie, for example, directly in front of the pilot along substantially a single line of sight.

Another object of the invention is to provide a flight attitude information giving instrument having movable visible indicator parts in substantially a single line of sight to give information both as to extent of roll or bank and extent of pitch during flight with the roll or bank indicating parts and the pitch indicating parts made to move under flight conditions, so that when viewed by the pilot during flight they move respectively in the same directions and with the same speeds as the movements executed by corresponding parts of the aircraft.

Another object of the invention is to provide flight attitude instruments of the character described in which the movement of the visible attitude indicating parts of each such instrument is effected by a gyro-vertical instrumentality.

A further object of the invention is to provide novel coupling arrangements between the gyro-vertical instrumentality and the visible flight attitude indicators of each such instrument to effect movement of these indicators when viewed by the pilot in the same direction as the movements made by corresponding aircraft parts whose attitude they are intended to denote whenever the aircraft changes attitude during flight.

A further object of the invention is to provide attitude indicators for each such instrument which resemble visually parts of the aircraft whose attitude or change of attitude during flight they are intended to denote.

Another object of the invention is to provide a flight attitude instrument having among its movable attitude indicators, at least one such indicator movable simultaneously both in response to changes in pitch and in roll during flight of the aircraft so that information as to aircraft flight attitude both as to roll and pitch of the aircraft in flight is available to the pilot by observation of said one such indicator.

A further principal object of the invention is to provide flight attitude instruments of the character described that will not "tumble" and which have full three hundred and sixty degree freedom of operation on all axes.

A further principal object of the invention is to provide gyro-vertical controlled flight attitude instruments of the character described provided with flight attitude indicators that are so arranged as to be readily interpretable by the pilot at all times as well as particularly during times of stress and mental or physical fatigue and thus materially reduce or substantially eliminate pilot tendencies at such times to make accidental errors in observation or errors in flight controlling operations as a result of instrument observational errors.

Yet another object of the invention is to provide flight attitude instruments of the character described that will enable safe blind flying when, for example, external visual references such as horizon, or clouds are entirely or substantially completely obscured.

Still other objects of the invention are to provide flight attitude instruments of the character described that are accurate in operation and capable of being installed in existing aircraft.

To the accomplishment of the foregoing and such other objects as may hereinafter appear, this invention consists in the novel construction and arrangement of parts hereinafter to be described and then sought to be defined in the appended claims, reference being had to the accompanying drawings forming a part hereof which show, merely for the purposes of illustrative disclosure, preferred embodiments of the invention, it being expressly understood, however, that changes may be made in practice within the scope of the claims without digressing from the inventive idea.

In the drawings in which similar reference characters denote corresponding parts.

In general, flight attitude instruments embodying the invention include a gyro-vertical instrumentality as a control, visible attitude indicator parts together with calibrated reference dial arrangements, and coupling mechanism between the indicator parts and the control all assembled as a unit for mounting in the cockpit of the airplane so that the visible indicator parts and calibrated reference dial arrangements are positioned in front of the pilot along substantially a single line of sight. In one form or modification of the invention the visible roll or bank indicator part and the visible pitch indicator part are separate entities. In a second form or modification of the invention one of the visible indicator parts, preferably the pitch indicator part, additionally, is arranged to give roll or bank attitude information as well as pitch information, while a second visible indicator part gives only roll or bank information to the pilot.

Referring to the drawing and first to the modification of Figs. 1-6 inclusive which embodies the first form just mentioned, 10 denotes generally a flight attitude instrument embodying the invention. This instrument 10 comprises generally a tubular container or enclosing casing 11 which is designed to enclose the operating parts of the device. The operating parts comprise a gyro-vertical 12, a bank indicator coupling mechanism 13, and pitch indicator coupling mechanism 14 all preferably enclosed within the casing 11. A transparent ring-like dial 15 mounted, for example, on a transparent panel 15a is secured to the forward end of the container 11. This dial 15 is appropriately marked with graduations or calibrations 15b that function as will be presently described to denote roll or bank of the aircraft during flight.

Figure 1:
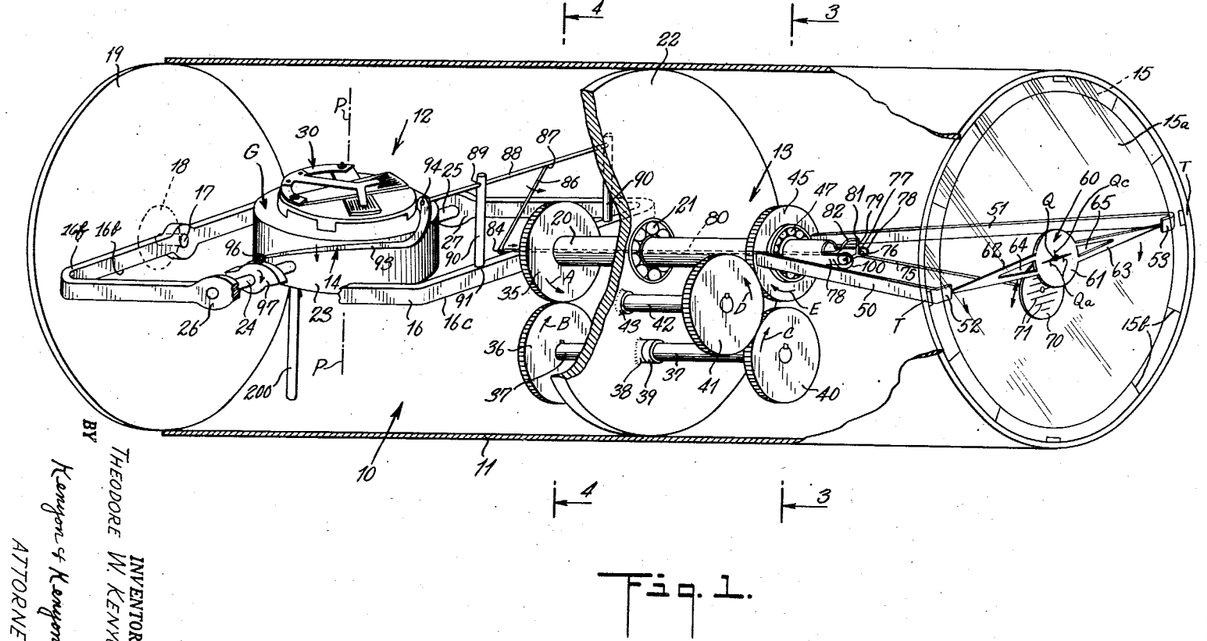
Fig. 1 is a sectionalized perspective view of a flight attitude instrument or device embodying the invention with parts broken away for visual clarity.

The gyro-vertical 12 comprises a gyroscope G that is preferably electrically driven and which is supported for freedom of movement about mutually perpendicular, normally horizontal axes and in substantial neutral equilibrium through the expedient of a gimbal construction 16. This gimbal construction 16 is supported by a stub shaft 17 in an appropriate bearing 18 carried, for example, in a rear cover, bulkhead, partition, or frame part 19 which is secured to extend transversely of the longitudinal axis of the container 11. A tubular shaft 20 is secured to the gimbal construction 16 in axial alignment with the stub shaft 17. This tubular shaft 20 extends through a ball bearing 21 or other friction reducing bearing carried by a bulkhead or partition 22 or other transversely extending member secured in the casing 11 intermediate its ends. The shafts 17 and 20 are axially aligned and preferably parallel with the axis of container 11 so that horizontal disposition of the casing or container 11 correspondingly provides horizontal disposition of the aligned axes of shafts 17 and 20.

The rotor-bearing casing 23 [within which the gyro-rotor (not shown) of the gyroscope G is journalled so that the axis of rotation P—P of the rotor shaft is normally vertical] is supported in the gimbal construction 16 for rotation about a horizontal axis which is perpendicular to that of the shafts 17 and 20. To this end axially aligned stub shafts 24, 25 are secured to the casing 23 at diametrically opposite points. These stub shafts are supported rotatably within axially aligned bearings 26, 27 provided on the gimbal frame 16. These bearings 26, 27 are so positioned that the axis of shafts 24, 25 when mounted therein is horizontal and perpendicular to the axis through the shafts 17 and 20.

The gyro-vertical 12 also includes an erector mechanism 30. This erector mechanism may be of conventional design or, preferably, of a type described in a copending application of mine filed May 9, 1947, and bearing Serial No. 746,995, Patent No. 2,464,516. The erecting mechanism 30 associated with gyro-vertical instrumentality 12, however, does not constitute a part of the present invention.

The container 11 bearing the gyro-vertical 12 is mounted within the airplane so that the axis through the shafts 17 and 20 lies substantially parallel with the fore and aft direction of the plane and so that normally the disposition of the axis P—P of the gyro-rotor is vertical for purposes presently to be described.

A gear 35 is secured on the tubular shaft 20 to rotate therewith. This gear 35 meshes with a gear 36. The tooth ratio of these gears is preferably 1:1. The gear 36 is secured to a stub shaft 37 which is rotatably supported in a bearing 38 provided on the partition 22. The shaft 37 is fixed against longitudinal displacement in bearing 38 in any conventional way, for example, by collars 39, only one of which is shown. A gear 40 is splined or otherwise secured to the portion of shaft 37 which projects through to the opposite side of the partition 22. This gear 40 is of slightly smaller diameter than the gear 36 for purposes presently to be described. The gear 40 in turn meshes with an idler or reversing gear 41 that is borne on a rotatable stub shaft 42. The stub shaft is rotatably supported in a bearing 43 provided on the partition 22. The idler or reversing gear 41 in turn meshes with a gear 45 whose tooth ratio with respect to the gear 40 is also preferably 1:1. This gear 45 is rotatably supported on ball bearings 47 or other friction reducing bearings carried by the shaft 20 so that gear 45 can rotate freely on its supporting shaft 20. The diameters of gears 45 and 40 is the same and they are sufficiently reduced in diameter relative to meshing gears 35, 36 to provide effective clearance for each other since they are coplanar and must not mesh but must be coupled through the reversing gear 41 to rotate in opposite directions for purposes to be presently described. The gears 35, 36, 40, 41, 45 constitute a gear train whose purpose will presently become clear.

A pair of frame parts or leg members 50, 51 are secured to the face of the gear 45 at diametrically opposite points. Both parts 50 and 51 extend forwardly of the face of said gear 45 so that their longitudinal axes are coplanar with a projection of the longitudinal axis of shaft 20. These parts 50, 51 are of equal length. Diametrically, oppositely inwardly extending flanges 52, 53 are provided at the terminal ends of the parts 50, 51.

A bank or roll indicator 60 is secured to the respective flanges 52, 53. This indicator may have any desirable appearance. In the embodiment shown, when viewed head-on it resembles generally the front profile view in miniature of an airplane and includes a centrally located disc 61 which gives the illusion of a rotating propeller. The arms or legs 62, 63 are secured to the disc 61. These arms which are joined to the respective flanges 52, 53 are shaped so that their outer contours give the appearance generally of the outer contour of the wings of the airplane. Spaces 64, 65 in the respective arms are provided for purposes presently to be described. The longitudinal axis of the indicator 60 as a whole, when secured to flanges 52, 53 is positioned to intersect a projection of the axis of the tube 20 at right angles. The indicator 60 secured as described is then rotatable about such intersection as a center, as will be presently described. If desired, a head-on view Q of an airplane with the axis through its wings parallel with the longitudinal axis of the indicator 60 may be applied to the visible face of the disc 61.

The pitch indicator mechanism denoted generally by the reference character 14 is arranged to operate a pitch indicator 70 and functions to operate the latter solely in upward or downward direction with respect to the normally horizontal position of the longitudinal axis T—T of the indicator 60. The pitch indicator 70 lies behind the disc 61. It is of slightly larger diameter than disc 61. In level flight it is concentric with the latter. This concentricity facilitates the pilot's judgment of the existence of level flight because the small rim 70a of disc 70 visible at such time has uniform dimensions (see Fig. 2). In addition disc 70 is provided with calibration or reference marks, for example, in the form of horizontal spaced apart lines 71 which serve conveniently as auxiliary references to indicate to the pilot the extent of downward or upward pitch of the plane, especially if these are large depending upon whether the lines 71 are visible below the lowermost edge of disc 61 or above its uppermost edge. The number of lines 71 visible serve as indicators of angle or extent of pitch.

This pitch indicator 70 is mounted on an end of a lever or rod 75. The opposite end of lever or rod 75 is secured at 76 to a transversely extending pintle or pivot member 77. The pintle 77 is supported rotatably in suitable bearings provided on a pair of parallelly arranged lugs 78 extending longitudinally from the forward end of the hollow shaft 20. The pintle 77 extends transversely between the lugs 78 and its axis is preferably coplanar with that of the tube 20, crossing the latter at right angles.

Figure 4:
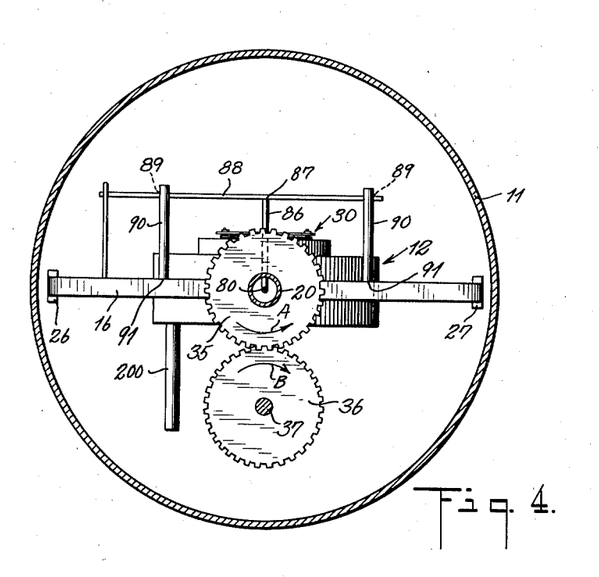
Fig. 4 is a transverse section on an enlarged scale taken along line 4—4 of Fig. 1 and also viewed in the direction of the arrows.

A second crank lever or rod 79 is secured to the pintle 77 extending therefrom at an angle with respect to lever 75. A link 80 is secured pivotally at 81 to the lever 79. This link 80 is bent at 82, 83 (Fig. 5) for clearance purposes with the lug bearing end of tube 20. The link 80 extends through and projects beyond the other end of hollow tube 20, and is pivotally joined at 84 to a crank arm or lever 86. This crank arm or lever 86 is secured rigidly at 87 to a shaft 88. The shaft 88 is rotatably supported, for example, in bearings 89 provided in posts, uprights, or supports 90 (Figs. 1 and 4). These uprights or supports 90 are secured at 91 to extend vertically from the gimbal construction or frame 16. The bearings 89 are arranged to maintain the shaft 88 substantially parallel with the upper surface of the gimbal construction or frame 16 and the supports 90 are so positioned that the axis of shaft 88 extends substantially at right angles with the axis of shaft 20. The joint 87 of the crank or lever 86 with the shaft 88 is preferably such that the lever 86 extends at right angles to the shaft 88.

A second crank or lever 93 (Fig. 1) is splined or otherwise rigidly secured at 94 to the shaft 88. A cam follower or roller 96 (Figs. 1 and 5) is secured rotatably to the crank 93. A cam 97 preferably of the surface type is secured on the stub shaft 24 to rotate with the latter, and the roller 96 engages the came surface. The levers and cranks described constitute a linkage means in conjunction with the cam 97.

The surface of cam 97 (Figs. 5 and 6) is provided with diametrically oppositely located identical portions K, K'; L, L'; M, M' and N, N'. In the embodiment shown, the portions K, K' each have an approximate radial extent of 20° and a total drop from the extreme cam diameter to the minimum diameter of the cam 97. The portions L, L' each has an approximate radial extent of 65°. The total drop in these portions L, L' from the extreme dimensions of the cam is approximately ⅓ of the total drop. The portions M, M' each has an approximate radial extent of 30° and the drop in these portions is approximately ⅓ of the total drop. The portions N, N' each has an approximate radial extent of 65° and the drop in these portions is also approximately ⅓ of the total drop. The cam 97, it will be noted, is symmetrical on each side of any diameter drawn therethrough. It is to be understood, however, that the particular angular disposition of various portions of the surface of the cam 97 and the extent of drop in each portion may be varied to suit particular conditions and as the occasion demands.

A biasing spring 100 (Figs. 1 and 5) is provided to maintain the cam follower or roller 96 in contact with the cam surface of cam 97. In the embodiment shown, this spring is helical and has one end fixed to one of the legs 78 and the opposite end fixed to the pivot rod 77. This spring is made strong enough to effect the desired biasing action without interfering with the movement of the pitch indicator 70. It may be located elsewhere and have other form. It also may be augmented by counterweights as described in conjunction with the second form of the invention as will hereinafter appear.

In operation of the form of device of Figs. 1–6 inclusive, it is assumed that it has been mounted in the airplane or other aircraft so that the axis of the shaft 20 lies substantially parallel with the fore and aft axis of the airplane. Furthermore, it is assumed that the normal position of the indicator 60 for level flight is horizontal, and further that the panel 15a, dial 15 and indicators 60 and 70 face the pilot with the container 11 and its contents extending forwardly of the panel 15a. With such assumptions, a bank or roll in either direction of the airplane while in flight will cause a corresponding rotation of the indicator 60 in the same direction as the rotaton executed by the airplane's wings in such bank or roll.

For example, if during flight the airplane rotates clockwise (a right bank) on its fore and aft axis when viewed in the direction of flight that is from the right of Fig. 1, the erecting action of gyro-vertical 12 which acts to keep axis P—P vertical causes a counterclockwise rotation of the gimbal construction or frame 16 about the axis of shafts 17 and 20 to maintain its horizontal disposition. This counterclockwise rotation is imparted to the shaft 20 which is fixed to the frame or gimbal construction 16. The gear 35 which is fixed to rotate with the shaft 20 consequently is given a similar counterclockwise rotation as denoted by the arrow A in Figs. 1 and 4. The gears 36, 40, 41 and 45 of the gear train in consequence are driven by the counterclockwise rotation of gear 35 in the directions of the respective arrows B, C, D, E, as shown in Fig. 1. The gear 45, it will be noted, because of the action of reversing gear 41, then rotates clockwise as the arrow E indicates. Since the supporting parts 50, 51 of the roll or bank indicator 60 are directly connected to the gear 45, the indicator 60 also is rotated clockwise to assume, for example, the dotted line position shown in Fig. 2. Moreover, since the gear ratios of gears 35 and 36 and of gears 40 and 45 are identical, preferably 1:1, the extent of clockwise rotation imparted to the roll or bank indicator 60 is identical with the extent of clockwise rotation that the wings of the airplane have made. The pilot is thus able to see directly by the indicator 60 that his plane has rotated clockwise and by reference to the dial 15 and its calibrations 15b can tell at a glance just how much of a clockwise roll the airplane has made. He then operates the necessary controls to restore the airplane to level flight.

When the airplane rotates counterclockwise rather than clockwise about its fore and aft axis, for example, in a left bank, the directions of rotation imparted by the erecting action of the gyro-vertical 12, to the gears 35, 36, 40, 41 and 45 of the gear train is directly opposite to that shown by their respective arrows A, B, C, D and E. In consequence the indicator 60 also rotates counterclockwise, assuming for example the dot-dash line position of Fig. 2.

To the pilot viewing the indicator 60, its arm 62 would represent the left wing of his airplane and its arm 63 would represent the right wing of his airplane. If the airplane rotates clockwise about its fore and aft axis when viewed in its direction of flight, the left wing goes up and the right wing goes down. The indicator arm 62 corresponding to the left wing also goes up and the indicator arm 63 corresponding to the right wing goes down. This is denoted by the dotted line position of these arms in Fig. 2. If the plane rotates counterclockwise about its fore and aft axis the right wing goes up and the left wing goes down. The indicator arm 62 then also goes up and the indicator arm 63 then goes down. This is denoted by the dot-dash line position of these arms in Fig. 2. In level flight without roll or bank, the roll or bank indicator 60 and its arms 62, 63 have the full line position shown in Fig. 2 with the arms 62, 63 extending horizontally, and with the center of generation of the disc portion 61 aligned with the axis of the shafts 17 and 20.

The described rotary movements imparted to the roll or bank indicator 60 through the gear train 35, 36, 40, 41 and 45 because of the direct connection of the gear 35 with the gimbal frame 16 cause substantially instantaneous follow-up rotary action of the indicator 60 in response to roll or bank of the airplane and at the same speed because the gyro-vertical 12 always acts to restore the gimbal frame 16 to horizontal almost instantaneously when any bank or roll occurs.

Figures 2, 3:
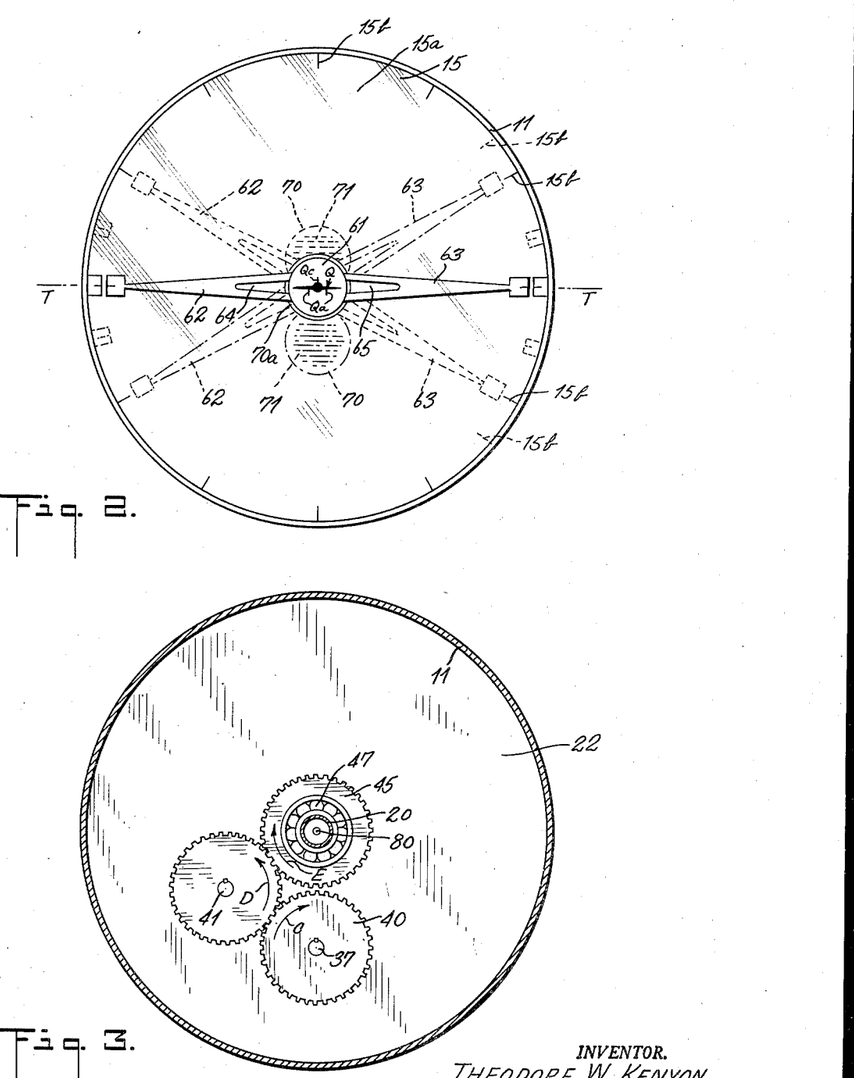
Fig. 2 is an enlarged end view of the device or instrument seen from the right of Fig. 1 and illustrating the appearance of the indicator parts of the device visible to the pilot in the cockpit of an airplane and showing various positions during flight.
Fig. 3 is a transverse section on an enlarged scale taken along line 3—3 of Fig. 1 and viewed in the direction of the arrows.
Figures 5, 6:
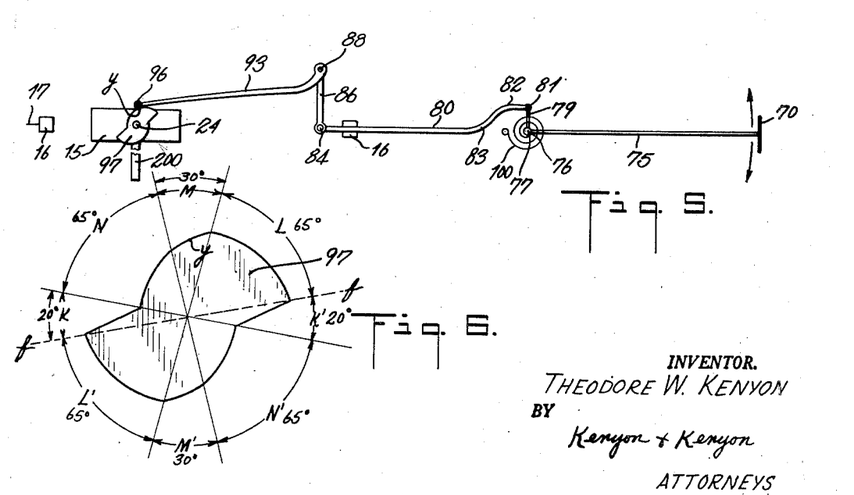
Fig. 5 is an elevational, partially diagrammatic view on a reduced scale of the control mechanism that operates the pitch indicator of the device of Fig. 1.
Fig. 6 is an elevational enlarged view of the pitch indicator control cam of the device of Fig. 1.

The pitch indicator 70 in the normal position of level flight lies behind the disc 61 of the indicator 60, with the ring 70a uniformly visible as seen in full line in Fig. 2. At this time the cam follower 96 lies approximately at the mid-point Y of the portion M of the cam surface 97 as shown in Figs. 5 and 6. If the nose of the airplane tilts downwardly during flight (a downward pitch), the restoring or erecting action of the gyro-vertical 12 about the axis of shafts 24 and 25 causes a clockwise rotation of the shaft 24 and with it a corresponding clockwise rotation of the cam 97. This causes lower portions of the cam surface 97 between point Y and the minimum cam diameter in position N thereof to move under the cam roller or follower 96 which moves down under action of spring 100. This causes counterclockwise rotation of crank 93 and corresponding counterclockwise rotation of shaft 88 and of crank 86. This rotation moves link 80 forwardly through shaft 20 toward panel 15a and causes consequent clockwise rotation of crank 79 and of pintle 76 and of rod 75 so that the indicator 70 attached to rod 75 moves downwardly and more of it appears below the lower edge of the disc 61. Those reference marks or calibrations 71 visible are an indication of the extent of the pitch or angle of tilt of the nose of the airplane downwardly relative to level flight. The dot-dash position in Fig. 2 of indicator 70 indicates a downward pitch.

If the nose tilts upwardly the direction of rotation imparted to the cam 96 by the erecting action of gyro-vertical 12 is the reverse of that on a downward tilt or pitch with consequent reversal of direction of movement of the indicator 70. With upward pitch those calibrations or reference marks 71 which then become visible above the edge of disc 61 are an indication of the extent of pitch or of angular tilt of the nose of the airplane upwardly relative to level flight. The dotted line position of indicator 70 in Fig. 2 represents an upward pitch.

The spaces 64, 65 in the pitch or roll indicator 60 permit clear visibility of the pitch disc 70 and of its calibrations or reference marks 71 irrespective of the angular disposition of the arms 62, 63 of the bank or roll indicator 60 so that the pilot is always able to read both the extent of roll by reference to the indicator 60 and the extent of pitch by reference both to indicator 70 and those of its indicator lines 71 which become visible above or below the peripheral edge of disc 61 in upward or downward pitch.

Since the erection force of the gyro-vertical 12 in operation always acts to maintain the plane of the gimbal frame 16 substantially horizontal, the lugs 78 on shaft 20 and in consequence pintle pivot rod 77 are always maintained substantially horizontal. In consequence, the only material motion ever imparted to the pitch disc 70 is an up and down motion or an arc defined by the lever 75 as a radius and the axis of the pintle or pivot rod 77 as a center of rotation. The arc and the axis of the lever 75 thus lie in a substantially vertical plane at all times. This plane includes preferably a projection of the axis of the shaft 20.

The gear train is even active through a full 360° rotation of the airplane so that the roll or bank indicator 60 is effective for a full 360°. Likewise, the symmetry of the cam 97 on opposite sides of any diametrical line drawn therethrough insure effective action of the pitch indicator 70 during any extent of pitch. If an airplane should fly upside down the cam follower 96 will operate on the portions L', M', N' and K' of the cam 97 instead of on the usual portions L, M, N and K during right-side up or normal flight. The reason for smaller angular widths of the drop portions M and M' with relationship to the angular widths of the drop portions L, N and L', N', is to make the responsive movement of the pitch indicator 70 very sensitive even to small pitch departures from level flight.

It is desirable in some instances to provide an arrangement in which one of the attitude indicators, preferably the pitch indicator, could resemble a small airplane and function to show roll or bank attitudes of the wings of the airplane in flight as well as pitch. Such an arrangement would increase the utility of the attitude instrument for flight purposes and further reduce the possibilities of erroneous observations by the pilot and thereby contribute to safer flying. A modified form of the invention providing such an arrangement is shown in Figs. 7–13 inclusive.

This embodiment is intended to be operated by the same gyro-vertical instrumentality of Figs. 1–6 inclusive, and all reference characters in Figs. 7–13 inclusive having similar construction and function as those in Figs. 1–6 inclusive have similar reference characters with the subscript a. The gyro-vertical 12a (Fig. 7a) like gyro-vertical 12 is supported from the gimbal ring 16a in the same way as gyro-vertical 12. A cam 97a (Fig. 7a) like cam 97 is supported on shaft 24a and functions for the same purposes in conjunction with a cam follower 96a like cam follower 96 to operate the crank 93a of the pitch indicator mechanism in the same way as crank 93 is operated.

A tubular shaft 20a (Figs. 7 and 9) is secured to the gimbal construction 16a in axial alignment with the stub shaft 17a (Fig. 7a) corresponding to stub shaft 17 of Fig. 1. The tubular shaft 20a extends through a ball bearing 21a or other friction reducing bearing carried by the partition or bulkhead 22a. A gear 35a is secured on the tubular shaft 20a for rotation therewith. This gear 35a meshes with a gear 36a and the tooth ratio of these gears is preferably 1:1. The gear 36a is secured to a stub shaft 37a which is rotatably supported in a bearing 38a provided on the bulkhead or partition 22a. A gear 40a is splined or otherwise secured to the stub shaft 37a on the opposite side of the partition 22a. This gear 40a is of slightly smaller diameter than the gear 36a for the same purposes as gear 40. The gear 40a in turn meshes with an idler or reversing gear 41a (Figs. 10 and 11) that is borne on a rotatable stub shaft 42a which is supported suitably in a bearing (not shown) in the bulkhead or partition 22a. The idler or reversing gear 41a in turn meshes with a gear 45a (Figs. 7, 9, 10 and 11) whose tooth ratio with respect to the gear 40a also is preferably 1:1. This gear 45a is rotatably supported on ball bearings 47a (Fig. 9) or other friction reducing bearings carried on a reduced portion 20b of the shaft 20a, so that gear 45a can rotate freely on the supporting shaft portion 20b. The gears 35a, 36a, 40a, 41a, 45a constitute a gear train substantially identical with the gear train provided by gears 35, 36, 40, 41 and 45 of the modification of Figs. 1–6 and are operated in the same way by the erecting action of gyro-vertical 12a.

A bracket member 120 (Fig. 9) is secured to the gear 35a to rotate therewith on the bearings 47a. This member 120 has a pair of arms 121, 122 at diametrically opposite points which extend substantially parallel with the axial direction of shaft 20a. Arcuate portions 121a and 122a are provided on these arms and at least one of these arcuate portions, for example, arcuate portion 122a has a longitudinally extending guide slot 123 for purposes presently to be described.

Frame parts or leg members 50a, 51a are secured to the arms 121a, 122a. These leg members 50a, 51a correspond to the frame parts or leg members 50, 51 of Figs. 1–6 inclusive. They are of equal length and are provided at their terminal ends with diametrically oppositely inwardly extending flanges 52a, 53a. These flanges 52a, 53a are aligned and are 180° apart and lie adjacent an annular ring-like dial 125. The dial 125 is secured to or provided on a transparent panel 126 of glass or other transparent material. This panel 126 is secured to the forward end of the container 11a in any desirable way so that the center of the dial 125 is aligned with the axis of shaft 20a. The dial 125 is provided with calibration marks 127 for indication of degrees of rotation. The position of the flanges 52a, 53a with reference to these calibration marks when the device is operated as will be presently described is used in part for determination of the extent of roll or bank of the airplane. In other words the flanges 52a, 53a provide one roll or bank indicator arrangement or means.

Another attitude indicator 130 (Figs. 7, 9, 12, 13) is provided. This attitude indicator 130 which replaces the pitch indicator 70 of Figs. 1–6 has the general appearance, when viewed by the pilot, of a small airplane. The indicator 130 has circular portion 130a. A pair of arms 130b, 130c extend radially therefrom in opposite direction. The shapes of these arms 130b, 130c generally resemble the head-on view of airplane wings. The indicator 130 is attached at its center 131 to one end of the lever or rod 132. A tubular sleeve 133 is secured to the opposite end of rod 132. This sleeve 133 is mounted rotatably as by jewel or ball bearing 134 upon a crank arm or lever 135. This lever 135 is secured to a collar 136 that is fixed to a pintle or pivot rod 137. The pintle 137 is pivotally supported by a pair of lugs 138, 139 carried by a tubular sleeve 140. The sleeve 140 is fixedly mounted upon the reduced portion 20b of shaft 20a so as to rotate with the latter. Counterweights 141 are secured to projections 142 of the pintle 137 for balance of the pitch indicator 130 about the axis of pintle 137 as a center as will presently be described. A biasing spring 100a is provided that functions for the same purposes as biasing spring 100 of Figs. 1–6. A bracket member 144 is secured to the sleeve 133. A pin 145 is secured to this bracket member 144 for movement in the guide slot 123.

Figures 7, 7A, 8:
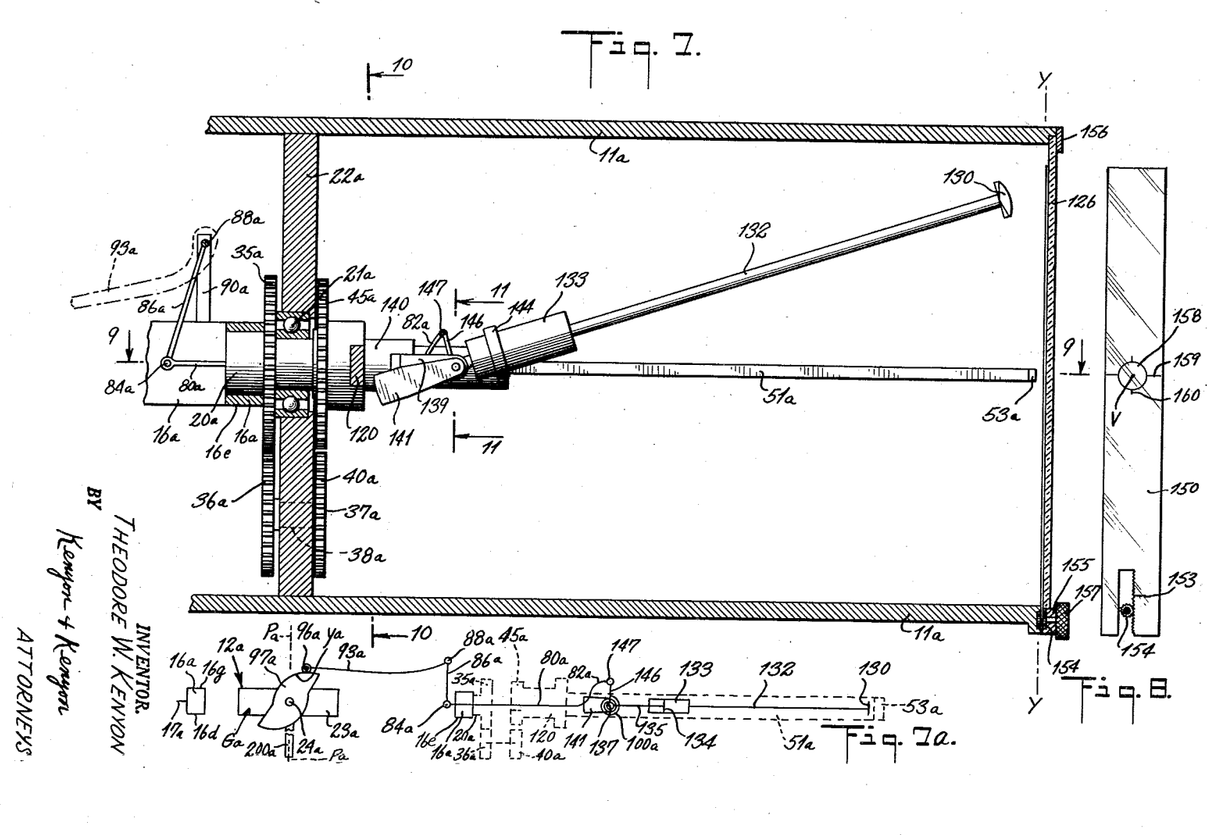
Fig. 7 is a fragmentary longitudinal section of a modified form of flight attitude instrument embodying the invention taken along line 7—7 of Fig. 9 and showing a position of indicator parts in an upward tilt of the airplane nose.
Fig. 7a is an elevational, partially diagrammatic view on a reduced scale of the control mechanisms that operate indicator parts of the device of Fig. 7.
Fig. 8 is an elevational view of structural details of a part of the dial arrangement of the modified form of instrument.
Figure 9:
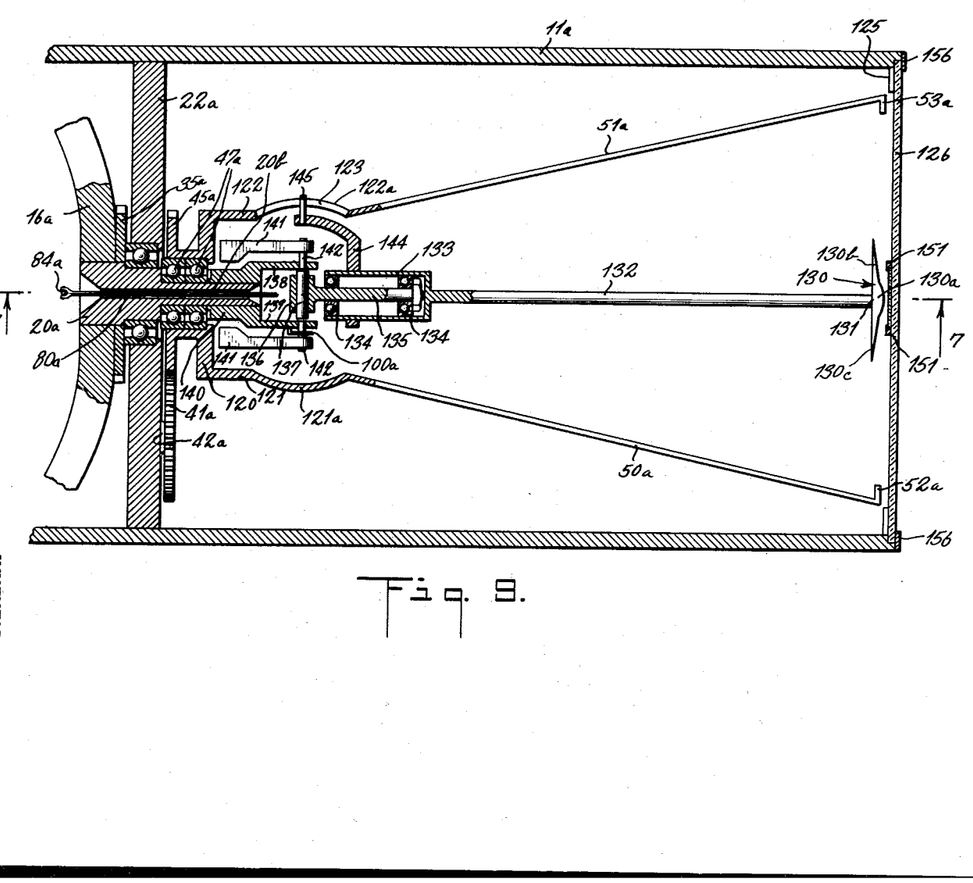
Fig. 9 is a longitudinal section taken along line 9—9 of Fig. 7.
Figure 10:
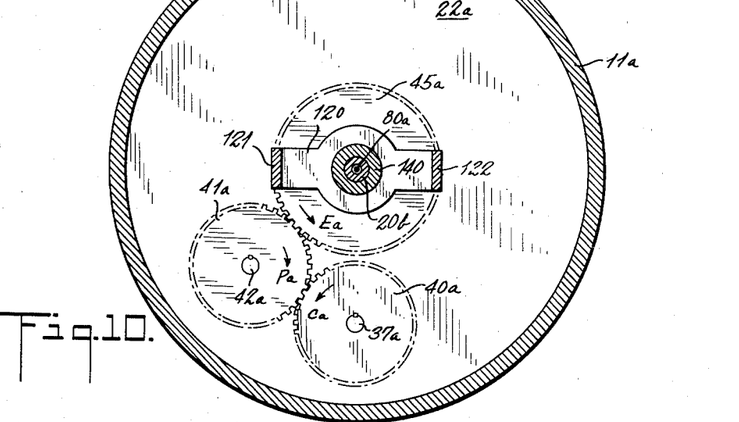
Fig. 10 is a transverse section taken along line 10—10 of Fig. 7.
Figure 11:
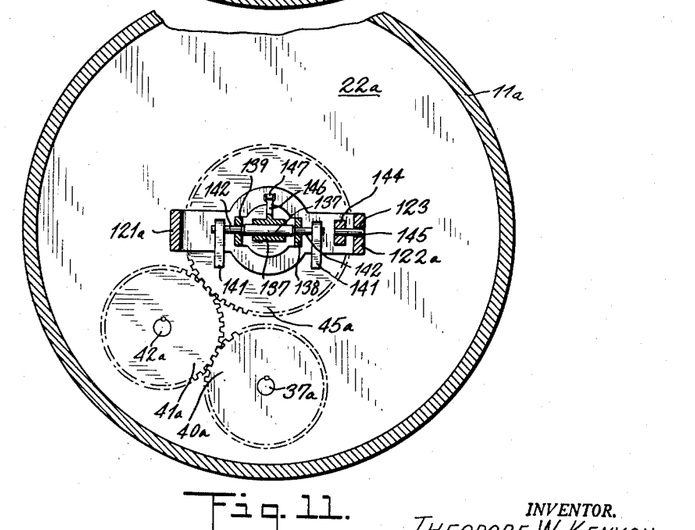
Fig. 11 is a transverse section taken along line 11—11 of Fig. 10.

A radially extending crank or lever 146 is secured to the collar 136 (Fig. 7a). This crank is pivotally secured at 147 to the bent portion 82a of a link 80a which corresponds to link 80. The link 80a is pivotally joined at 84a (Figs. 7, 7a and 9) to the crank 86a. The crank arm 86a, in turn, is secured to the shaft 88a which is carried rotatably in the uprights 90a which are mounted upon the gimbal construction or frame 16a. The crank lever 93a which corresponds to crank lever 93 is keyed or otherwise secured to shaft 88a. Thus the motions imparted by the cam 97a which corresponds to cam 97, to crank lever 93a in response to erecting movements of the gyro-vertical 12a relative to shaft 24a, similar to corresponding erecting movements of gyro-vertical 12, are transmitted to cause pitch movements of the indicator 130 that are similar to pitch movements imparted to pitch indicator 70 as will presently be described. The levers and links described comprise a linkage means in conjunction with the cam 97a.

Figure 12:
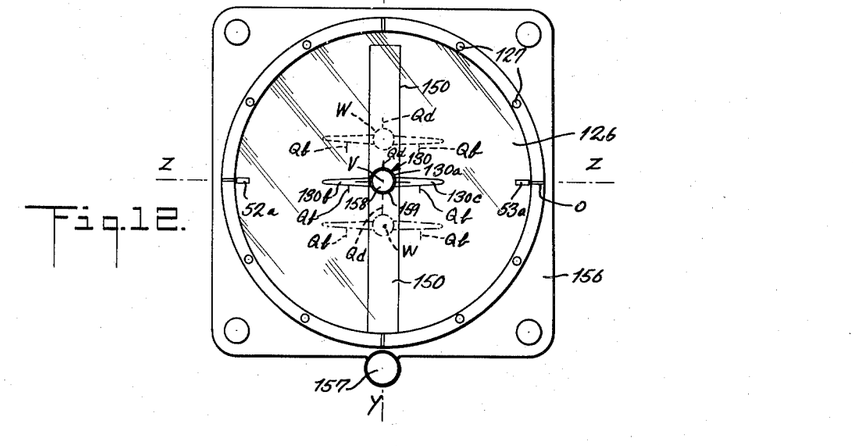
Fig. 12 is an end elevation of the device of Fig. 7 showing the appearance of the dial and indicator parts of the device visible to the pilot in the cockpit of an airplane, the indicator parts shown in full line being the positions thereof during level flight, while indicator parts therein shown in dotted and broken lines are positions assumed thereby on up and down tilt or pitch during flight.

A second transparent dial part 150 (Figs. 7, 8, 9, 12 and 13) is provided. This dial part in the embodiment shown is substantially a rectangular strip of transparent material such as Celluloid. It is arranged so that its central longitudinal axis is parallel with the normally vertical diameter Y—Y of the panel 126 (Fig. 12). Guides 151 (Fig. 9), also preferably of transparent material, are provided along the long sides of the dial part 150. These guides 151 permit longitudinal movement of the dial part 150 in either up or down direction parallel with the normally vertical diameter Y—Y of the panel 126. The dial part 150 has a rack 153. A pinion 154, secured to a shaft 155, meshes with the rack 153. The shaft 155 is secured rotatably in a panel mounting frame 156 so that the pinion 154 extends into an appropriate recess provided in the end of casing 11a to mesh with the rack 153. A knob 157 secured to shaft 155 is provided to rotate the shaft 155 and with it pinion 154 to cause desired up and down motion of the dial part 150 in parallelism with the normally vertical diameter Y—Y of the panel 126. The dial part 150 has a circular marking 158 of slightly smaller diameter than the circular portion 130a of the pitch indicator 130 and radially oppositely extending normally horizontal markings 159 and radially oppositely extending normally vertical markings 160 for purposes presently to be described. The dial part 150 is made adjustable relative to the diameter Y—Y so that the instrument as a whole may be adjusted by the pilot during flight for different speeds of the airplane. The vertical markings 160 are always parallel and aligned with the diameter Y—Y. The horizontal markings 159 when dial part 150 is moved by manipulation of the knob 157, are displaceable to positions above or below the level of the normally horizontal diameter Z—Z of panel 126.

Under normal conditions of flight, the dial part 150 is so positioned so that the markings 159 are on a level with the said horizontal axis Z—Z. The dial part 150 is only shifted from this position during initial climb of the airplane at take-off, or during descent of the airplane for landing at which times the nose of the airplane has an upward angular disposition necessary to insure proper wing attitudes for lift. At different take-off and landing speeds, of course, the lift angle of the wings is different and simple manipulation of the knob 157 permits the pilot to adjust the dial part 150 to compensate for the take-off and landing angles of the wings at different speeds. Such adjustment of the dial part is necessary at these times so that the pitch indicator 130 will give true readings of pitch departures from the required wing angles either during take-off or landing.

During normal flight, of course, the wings become substantially horizontal, and at such times the dial 150 is adjusted to the position shown in Fig. 12 that is with markings 159 on a level with diameter Z—Z.

For description of operation, assumption is made that the airplane is actually in flight at desired altitude, and that casing 11a has been mounted in the plane or other aircraft so that the axis of shaft 20a lies parallel with the fore and aft axes of the plane, and furthermore that the normal positions for level flight of the indicator arms 130b and 130c and of the indicator flanges 52a, 53a are horizontal and are all aligned with the Z—Z axis of the panel 126 as shown in full lines in Fig. 12, and furthermore that the panel 126 is positioned in the cockpit in front of the pilot with the casing 11a extending forwardly of panel 126 in the direction of flight.

Figure 13:
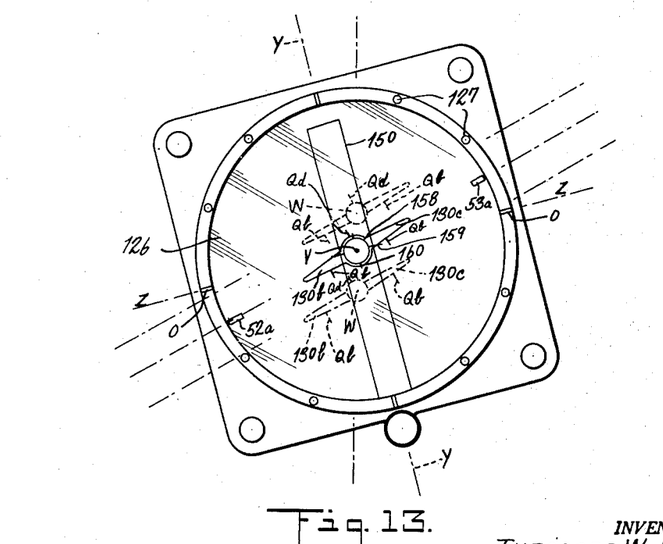
Fig. 13 is a similar end elevation showing the appearance of the dial and visible indicator parts during both roll and pitch, the full line indicator parts indicate a left bank and zero pitch, while the dot dash line and dotted line positions indicate a left bank of the same extent and, respectively, a downward or an upward pitch of the aircraft that may occur during flight.

If during such flight, the airplane rotates counterclockwise, for example, in a left bank, on its fore and aft axis when viewed in the direction of flight, for example, from the right of Fig. 7, or from in front of the panel 126 as seen in Figs. 12 and 13, the gyro-vertical 12a (corresponding to gyro-vertical 12 of Figs. 1-6) causes a clockwise rotation of the gimbal construction or frame 16a to maintain its horizontal disposition. The clockwise rotation of frame 16a is imparted to the shaft 20a which is fixed to the gimbal frame 16a. The gear 35a rotates with the shaft 20a consequently giving it a similar clockwise rotation. The gears 36a, 40a, 41a and 45a, in consequence, are driven. The directions of the respective arrows Ca, Da, Ea, shown in Fig. 10 indicate the direction of drives then imparted to gears 40a, 41a and 45a. The gear 45a because of the action of reversing gear 41a, then rotates counterclockwise as arrow Ea indicates. Since bracket member 120 is secured to gear 45a and the leg members 50a, 51a are secured to portions 121a, 122a of bracket arms 121, 122 of bracket member 120, and since flanges 52a, 53a are parts of leg members 50a, 51a, the latter rotate synchronously counterclockwise in the same direction as gear 45a and to the same angular extent in a plane adjacent the dial ring 125 that is substantially perpendicular to a projection of the axis of shaft 20a. The intersection of the rotational plane just mentioned and said axis of shaft 20a constitutes a determined center of rotation. This center of rotation is concentric with the center of generation of the dial ring 125 which lies adjacent the flanges 52a, 53a and coincides with the center V of the dial ring 158 (in normal level position of the latter as shown in Figs. 12 and 13). The new position of these flanges 52a, 53a is shown in Fig. 13. The horizontal diameter Z—Z of the panel 126 also has rotated counterclockwise in the left bank of the aircraft but the angular distance of the flange 53a above the right-hand horizontal reference line O of the dial ring 125 represents the actual upward rise of the right-hand plane wing. Similarly the angular distance of the flange 52a below the left-hand horizontal reference line O of dial ring 125 represents the actual downward dip of the left wing of the airplane during the particular left bank executed.

At the same time because of the engagement of pin 145 in slot 123 of the arm 122a (Fig. 9), and because of the direct coupling of pin-bearing arm 144 to sleeve 133 of the shaft 132, the pitch indicator 130 rotates to the same angular extent and in the same direction as flanges 52a, 53a to assume the full line position of Fig. 13 so that right arm 130c of the indicator 130 which resembles the right airplane wing has the same rise as the right airplane wing, and so that left arm 130b which resembles the left airplane wing has the same dip as the left airplane wing in the particular left bank illustrated. As long as no plane pitch exists, the tips of arms 130b and 130c are aligned respectively with the flanges 52a, 53a so that the pilot by merely glancing at the pitch indicator 130 in its full line position of Fig. 13 can tell both the direction of roll or bank and its angular extent.

It will be remembered, of course, that the longitudinal axis of pintle 137 which is transverse to that of shaft 20a always remains substantially horizontal because the sleeve 140 which carries the pintle-supporting lugs 138, 139 is secured to extension 20b of said shaft 20a and that the shaft 20a is secured to the gimbal 16a and that the erecting action of the gyro-vertical during a roll or bank is such that the rotation about the axis of shaft 20a imparted by this erecting action to gimbal frame 16a keeps it horizontal. The jewel bearings 134 between crank 135 carried by pintle 137 and the sleeve 133 eliminate direct transmission of any rotation of shaft 20a to sleeve 133. The latter will only rotate on the bearings 134 as a result of the reverse rotation imparted to gear 45a through the agency of the pin and slot arrangement 145, 122a.

During a roll or bank in normal flight without pitch, the center of the disc 130a of the pitch indicator 130 is aligned with the center V of the reference disc 158 of the dial 150. As long as no pitch occurs during such normal flight, the pitch cam 97a corresponding to cam 97 remains unactuated. In consequence, the pitch indicator disc 130a remains centered relative to reference disc 158 of the dial 150. As soon as the aircraft executes a pitch during its normal flight, irrespective of whether a roll or bank has also occurred, the aforesaid cam 97a is actuated as a result of the erecting action of the gyro-vertical 12a about the horizontally maintained axis of shaft 24a (Fig. 7a) which is perpendicular to the axis of the shaft 20a. Assuming a downward tilt of the aircraft nose without any roll or bank, the cam 97a corresponding to cam 97 is rotated clockwise about the horizontal axis of shaft 24a transverse to the axis of shaft 20a. This causes a counterclockwise rotation of crank 93a because the cam follower 96a corresponding to cam follower 96 moves downwardly from a high point Ya on the surface of cam 97a corresponding to point Y to a lower part thereof. The counterclockwise rotation of crank 93a is transmitted to shaft 88a and crank 86a. This moves the link 89a forwardly through shaft 20a toward panel 126 and causes a consequent clockwise rotation of lever 146. This clockwise rotation is transmitted through collar 136 borne on pintle 137 to crank 135 which carries sleeve 133 and consequently to the sleeve attached lever or rod 132 which latter carries the pitch indicator 130. The latter (assuming no roll or bank) is moved downwardly to the dot-dash line position of Fig. 12. The distance of the center W of the pitch indicator below the center V of the marking disc 158 on dial 150 is a measure of the downward pitch of the nose of the airplane.

As the downward pitch of the aircraft is corrected by the pilot the reverse of the sequence of operations described occurs as to movements of the rod 132, because of a reversal of direction of rotation of the cam 97a, and the pitch indicator 130 moves in return direction toward its full line position of Fig. 12. If overcorrection occurs resulting in an upward pitch, or if the aircraft initially executes an upward pitch of its nose relatively to level flight the rotation of the cam 97a either continues or moves in reverse to that it has executed for a downward pitch causing the pitch indicator 130 to move upwardly above the normal full line position of Fig. 12, for example, to the dotted line position of Fig. 12. The distance of its center W above the center V of the marking disk 158 on dial 150 is a measure of the upward pitch of the nose of the aircraft.

If during either a downward or upward pitch, the aircraft executes alone a roll or bank, the indicator 130 besides being given the upward or downward movements relative to the center V of the marking disk 158 on dial 150 also is rotated as described by the gear train 35a, 36a, 40a, 41a and 45a so that its arms 130b and 130c assume positions corresponding to the respective left and right wings of the aircraft. If, for example, the aircraft executes a left bank and simultaneously a downward pitch, the pitch indicator 130 is moved downwardly through the agency of the cam actuated arrangement described, and simultaneously rotated by the gear train arrangement so that the pitch indicator 130 for the specific downward pitch and specific roll in the specific bank assumes the dot dash position shown in Fig. 13. The vertical distance of the center W from the center V is a measure of the downward pitch. The angular disposition of the arms 130b, 130c denotes the direction and angular extent of roll. As previously described, the flanges 52a, 53a have been simultaneously rotated by the gear train to corresponding angular disposition so that reference to them by the pilot in relationship to the calibrations 127 on the dial ring 125 enables him, if he desires, to make an exact reading of the angular extent of roll of the wings.

If an upward pitch rather than a downward pitch occurs during a similar left bank, the pitch indicator is moved vertically upward to the dotted line position of Fig. 13. The distance of center W above fixed reference center U of the dial part 150 is a measure of the upward pitch. The axis passing through the oppositely extending wings 130b, 130c of the pitch indicator irrespective of the extent of up or down pitch always extends in parallelism with an axis joining the two flanges 52a, 53a. These two axes coincide at all times of zero pitch during normal flight irrespective of the extent of roll because the same gear train actuates the angular rotation both of the flanges 52a, 53a, and of the pitch indicator 130 caused by roll of the aircraft.

The form of invention disclosed in Figs. 7 to 13 inclusive thus provides a single attitude indicator means 130 which functions both for visual determination of both pitch and roll or bank attitudes or changes of such attitudes and additional roll or bank attitude indicator means 52a, 53a for accurate determination, if desired, at all times of the exact angular extent of roll or bank attitudes or changes of such roll or bank attitudes. Moreover, in both forms of invention described, the movements of the attitude indicators are always in the same directions and substantially simultaneous with and at substantially the same speeds as movements of corresponding aircraft parts with changes of attitude. In the first form of invention described, the pitch attitude indicator is separate from the bank or roll indicator. In both forms of the invention, the visible attitude indicators all lie concentrated along substantially a single line of sight, and are readily recognizable by the pilot. In consequence, the dangers of erroneous readings are substantially reduced, flying becomes safer, and fewer accidents are likely to occur.

With respect to the form of invention shown in Figs. 1–6, as well as with respect to the form of invention shown in Figs. 7–13 inclusive, it is unnecessary for the gyro-verticals 12 or 12a to have full three hundred and sixty degree freedom of rotation about the axis, either of the shaft 24 or of 24a, in order still to have full three hundred and sixty degree freedom of operation on all axes for the various attitude indicators of either modification. It is sufficient if the rotation of said gyro-verticals 12 or 12a on the axes of either of said shafts 24 or 24a is approximately 180°. In fact, it is preferable if the latitude of such rotation is limited to something a few degrees short of 180° to prevent any possible dead center conditions. To provide for such limitation of rotation of the gyro-verticals 12 or 12a, a convenient arrangement is the provision of stop members 200 or 200a secured to the rotor-bearing casings 23 or 23a (see Figs. 1 and 7a) so as to extend downwardly therefrom substantially in parallelism with the axes P—P or Pa—Pa of the gyro-rotor shafts. These stop members 200 or 200a are admeasured in length to strike the gimbal frame part 16 or 16a at opposite under sides 16b or 16c (Fig. 1) or 16d, or 16e (Fig. 7a) when the pitch (tilt) of the aircraft either upwardly or downwardly approximates 90° in either direction. Thus a freedom of rotary movement of either the gyro-rotor axes P—P or Pa—Pa of approximately 180° is available. As a result the entire gimbal ring 16 or 16a in the event of a tilt of substantially 90° or more in either up or down direction will rotate the gimbal ring 16 or 16a sufficiently about the axes of shafts 17 and 20 so that the top face 16f (Fig. 1) or 16g (Fig. 7a) of either of the gimbals 16 or 16a (Figs. 1 or 7a) always remains up with respect to the ground. Therefore if the indicator marking Q of Fig. 1 or the indicator 130 of Figs. 12 and 13 is provided with marks Qa (Fig. 1) or parts Qb (Figs. 12 and 13) resembling wheels normally at their bottoms, and marks Qc (Fig. 1) or parts Qd (Figs. 12 and 13) resembling the tails of the aircraft, the pilot simply by visual reference to the indicator markings Q, Qa, Qc in Fig. 1 or indicator 130 and parts Qb and Qd of Figs. 12 and 13 knows immediately whether he is flying right side up or upside down. The application of the stop members 200 or 200a does not, however, in any way affect the full 360° responsiveness of any of the indicators of either modification themselves. In fact, it enhances the utility of either attitude instrument by enabling the pilot to additionally always determine his relative relationship to the ground as to right side up or upside down conditions of flight merely by visual reference to the Q markings or Q parts of the indicators.

The provision of these stop members 200 or 200a, however, is not essential for successful operation, and if desired, they need not be provided. If these stop members 200 or 200a are eliminated the wheel markings Qa or wheel parts Qb and the tail markings Qc or tail parts Qd should be eliminated.

If the stops 200 or 200a are provided, the duplication of the form of the cam on opposite sides of a diameter f—f of Fig. 6 can be obviated because the cam follower 96 or 96a will always only operate on, for example, the portions K, N, M and L of that figure. There is no harm, however, in providing the symmetrical arrangement of the cam 97 or 97a so that the installer will be able to decide upon whether or not to use the stop members 200 or 200a to meet particular conditions.

While specific embodiments of the invention have been disclosed, shown and described, variations in structural detail within the scope of the claims are possible and are contemplated. There is no intention, therefore, of limitations to the exact details shown and described.

What is claimed is:

1. A gyro attitude instrument of the character described comprising a roll or bank indicator rotatable in a plane about a determined center, a pitch indicator behind said roll or bank indicator movable substantially vertically upwards and downwards relative to said center, a gyro-vertical arrangement, gear means coupling said arrangement with said roll or bank indicator to rotate the latter in said plane, and cam actuated means coupling said gyro-vertical arrangement with said pitch indicator for effecting its said movement, and said gear means including a reversing gear to effect rotation of the roll or bank indicator in the same direction as the roll or bank of a moving body to which said instrument is secured.

2. A gyro attitude instrument of the character described comprising a roll or bank indicator rotatable in a plane about a determined center, a pitch indicator behind said roll or bank indicator movable substantially vertically upwards and downwards relative to said center, a gyro-vertical arrangement, gear means coupling said arrangement with said roll or bank indicator to rotate the latter in said plane, and cam actuated means coupling said gyro-vertical arrangement with said pitch indicator for effecting its said movement, and said cam actuated means including linkages connected always to move said pitch indicator in a direction corresponding to the pitch position assumed by the forward portion of the moving body to which said instrument is attached.

3. A gyro attitude instrument for denoting both roll and pitch of a moving body comprising an indicator means rotatable about a determined center, a second indicator means rotatable about said center and also movable substantially upwardly and downwardly relative to said center, a gyro-vertical means, and means coupling said gyro-vertical means to both of said indicator means, said coupling means including gear means for rotating both said indicator means about said center and operable in response to erecting action of said gyro-vertical means about one of two mutually perpendicular axes which is concentric with said center, and said coupling means also including cam means for imparting said upward and downward movement to the second of said indicator means and operable in response to erecting action of said gyro-vertical means about the second of said two mutually perpendicular axes.

4. A gyro attitude instrument for denoting both roll and pitch of a moving body comprising an indicator means rotatable about a determined center, a second indicator means rotatable about said center and also movable substantially upwardly and downwardly relative to said center, a gyro-vertical means, and means coupling said gyro-vertical means to both of said indicator means, said coupling means including gear means for rotating both said indicator means about said center and operable in response to erecting action of said gyro-vertical means about one of two mutually perpendicular axes which is concentric with said center, and said coupling means also including cam means for imparting said upward and downward movement to the second of said indicator means and operable in response to erecting action of said gyro-vertical means about the second of said two mutually perpendicular axes, and dial means in conjunction with said indicator means to facilitate positional readings thereof.

5. A gyro attitude instrument for denoting both roll and pitch of a moving body comprising an indicator means rotatable about a determined center, a second indicator means rotatable about said center and also movable substantially upwardly and downwardly relative to said center, a gyro-vertical means, and means coupling said gyro-vertical means to both of said indicator means, said coupling means including gear means for rotating both said indicator means about said center and operable in response to erecting action of said gyro-vertical means about one of two mutually perpendicular axes which is concentric with said center, and said coupling means also including cam means and linkages coupled to the second of said indicator means for imparting said upward and downward movement to the second of said indicator means and operable in response to erecting action of said gyro-vertical means about the second of said two mutually perpendicular axes.

THEODORE W. KENYON.

REFERENCES CITED

The following references are of record in the file of this patent:

UNITED STATES PATENTS

| Number | Name | Date |
|---|---|---|
| 1,856,436 | Schueller | May 3, 1932 |
| 2,326,835 | Carter | Aug. 17, 1943 |

FOREIGN PATENTS

| Number | Country | Date |
|---|---|---|
| 140,482 | Great Britain | Apr. 1, 1920 |